US012752426B2

(12) United States Patent
Wahrburg et al.

(10) Patent No.: US 12,752,426 B2
(45) Date of Patent: Oct. 6, 2026

(54) METHOD AND APPARATUS FOR IMPLEMENTING A SAFETY CONFIGURATION

(71) Applicant: ABB Schweiz AG, Baden (CH)

(72) Inventors: Arne Wahrburg, Weiterstadt (DE); Nuo Li, Mannheim (DE); Björn Matthias, Bad Schönborn (DE); René Kirsten, Fernwald (DE); Roger Mellander, Västeras (SE); Debora Clever, Zwingenberg (DE); Christoph Byner, Mannheim (DE); Harald Staab, Neckargemünd (DE); Silke Klose, Bensheim (DE)

(73) Assignee: ABB Schweiz AG, Baden (CH)

( * ) Notice: Subject to any disclaimer, the term of this patent is extended or adjusted under 35 U.S.C. 154(b) by 35 days.

(21) Appl. No.: 18/773,977

(22) Filed: Jul. 16, 2024

(65) Prior Publication Data

US 2024/0367320 A1 Nov. 7, 2024

Related U.S. Application Data

(63) Continuation of application No. PCT/EP2022/051053, filed on Jan. 18, 2022.

(51) Int. Cl.
*B25J 9/16* (2006.01)

(52) U.S. Cl.
CPC ........... *B25J 9/1674* (2013.01); *B25J 9/1653* (2013.01); *B25J 9/1664* (2013.01)

(58) Field of Classification Search
CPC ...... B25J 9/1674; B25J 9/1653; B25J 9/1664; B25J 9/1658; B25J 9/1676; G05B 2219/35473; G05B 2219/40202
See application file for complete search history.

(56) References Cited

U.S. PATENT DOCUMENTS

2017/0274532 A1* 9/2017 Nishitani ............... B25J 9/1671
2019/0030721 A1* 1/2019 Hoshiyama ............ B25J 9/1697
(Continued)

FOREIGN PATENT DOCUMENTS

JP 5435621 B2 3/2014
WO WO-2021010213 A1 * 1/2021 .......... B60W 60/001

OTHER PUBLICATIONS

Duhaut et al., "Integration of a Constraint Scheme in a Programming Language for Multi-Robots," *Robotic Systems: Advanced Techniques and Applications*, 487-494 (1992).

(Continued)

*Primary Examiner* — Bhavesh V Amin
*Assistant Examiner* — Karston G. Evans
(74) *Attorney, Agent, or Firm* — Whitmyer IP Group LLC

(57) ABSTRACT

A method for implementing a safety configuration for a manipulator comprising an end effector comprises: a) reading an action instruction from a manipulator control program, the instruction defining at least one of a path to be followed by the end effector, a target position to be reached by the end effector, a target pose to be assumed by the end effector and an action to be carried out by a tool wielded by the end effector; b) reading at least one constraint instruction from the manipulator control program, the constraint instruction defining a constraint to be observed while carrying out an action instruction; and c) carrying out the action instruction read in step a) while respecting the constraint defined in the at least one constraint instruction, or transferring the manipulator into a safety mode if violation of the at least one constraint is detected while carrying out the action instruction.

12 Claims, 3 Drawing Sheets

(56) References Cited

U.S. PATENT DOCUMENTS

| | | | | |
|---|---|---|---|---|
| 2021/0178595 | A1* | 6/2021 | Arora | B25J 9/1679 |
| 2022/0184810 | A1* | 6/2022 | Beck | B25J 9/1692 |
| 2022/0395979 | A1* | 12/2022 | Beardsworth | B25J 9/1676 |
| 2023/0211496 | A1* | 7/2023 | Naitou | B25J 9/161<br>700/253 |

OTHER PUBLICATIONS

Idasiak et al., "Distributing the IAda language for robot programming," *Proceedings of IEEE Systems Man and Cybernetics Conference—SMC*, 2: 288-293, IEEE (Oct. 17-20, 1993).
Monacelli et al., "Programming assistance over distributed systems: MAPES," *Proceedings of IEEE Systems Man and Cybernetics Conference—SMC*, 3: 630-634 (Oct. 17-20, 1993).
European Patent Office, International Search Report in International Patent Application No. PCT/EP2022/051053, 5 pp. (Aug. 31, 2022).
European Patent Office, Written Opinion in International Patent Application No. PCT/EP2022/051053, 8 pp. (Aug. 31, 2022).

* cited by examiner

```
L0  function main ()
L1  { #allowedRange [space, description]
L2    #allowedRange [speed, 0, vmax]
L3    #allowedRange [force, 0, Fmax]
L4    #synchPoint L14
...
L5    pCrate=find(Crate)
      { ...
L6      move(pCrate)
        ...
L7      move(pWorkpiece, orientation)
L8      seizeWorkpiece()
        ...
L9      #once#allowedRange [speed, 0, vmax1]
L10     move(pConveyor)
L11     installwp()
      }
      ...
    }

L12 function findCrate()
    { ...
    }
L13 function seizewp()
    { #allowedRange [force, 0, Fmax1]
      ...
    }
    ...
L14 ...
```

Fig. 2

METHOD AND APPARATUS FOR IMPLEMENTING A SAFETY CONFIGURATION

CROSS-REFERENCE TO RELATED APPLICATIONS

The instant application claims priority to International Patent Application No. PCT/EP2022/051053, filed Jan. 18, 2022, which is incorporated herein in its entirety by reference.

FIELD OF THE DISCLOSURE

The present disclosure generally relates to a method and to apparatus for implementing a safety configuration in a robot system.

BACKGROUND OF THE INVENTION

A safety configuration can be regarded as a set of constraints that have to be observed during operation of a robot in order to ensure health and safety of persons in the vicinity of the robot, and/or to prevent damage from unwanted interaction of the robot with surrounding hardware. In order to make efficient use of a robot, its safety configuration has to be adapted to a job the robot is to accomplish. Since the safety configuration should at no time restrict the freedom of movement of the robot more than necessary, the constraints to be observed will vary during the execution of a program, and the safety configuration will have to reflect the fact. So, whenever a robot control program is developed in order to enable the robot to accomplish a new job, developing a matching safety configuration requires a considerable amount of highly qualified labour.

BRIEF SUMMARY OF THE INVENTION

The present disclosure describes a method and apparatus that allow a safety configuration to be developed and implemented more efficiently. A flowchart for a method in accordance with the disclosure is shown in FIG. 3. According to one aspect of the invention, this object is achieved by a method for implementing a safety configuration for a robot comprising a manipulator and an end effector, comprising the steps of:

a) in a step 302, reading an action instruction from a manipulator control program, the instruction defining at least one of a path to be followed by the end effector, a target position to be reached by the end effector, a target pose to be assumed by the end effector and an action to be carried out by a tool wielded by the end effector, b) in a step 304, reading at least one constraint instruction from the manipulator control program, the constraint instruction defining a constraint to be observed while carrying out an action instruction, and c) in a step 306, carrying out the action instruction read in step a) while respecting the constraint defined in the at least one constraint instruction, or in a step 310, transferring the manipulator into a safety mode if violation of the at least one constraint is detected in a step 308 while carrying out the action instruction.

Defining constraints to be observed by way of program instructions, and combining these with action instructions for the manipulator in a same program facilitates synchronization of the constraints with movements of the manipulator to which they are meant to apply, thus relieving the programmer from the task of defining conditions for the entry into force or the revocation of a constraint, and reducing the risk of the manipulator being stopped because an inadequate constraint has been violated.

For the safety of operation of the manipulator, implementation of the safety configuration must not be affected by a malfunction in the control of actions of the manipulator. Therefore, for implementing the safety configuration a safety controller distinct and independent from an operation controller controlling execution of action instructions by the manipulator should be provided.

While above step b) of reading constraint instructions may be carried out by the safety controller and the operation controller alike, thereby enabling the operation controller to take account of constraints carrying out an action instruction and thus to proactively minimize the risk of a constraint being violated, step a) of reading an action instruction is preferably carried out by the operation controller alone; by thus keeping the safety controller ignorant of action instructions, the possibility of an action instruction causing a malfunction in both controllers is avoided.

Grouping instructions for executing a repetitive task into functions is a well-known means for efficient and concise program writing. Conventionally, a program may comprise a main function and functions invoked directly by the main function or indirectly via one or more intermediate functions. Safety constraints may vary from one such task to another. When constraint instructions are integrated into the functions, such changes of constraints may efficiently be taken account of when, by default,

- a constraint instruction of an invoking function is valid during execution of a function invoked by it, and/or
- a constraint instruction of an invoked function becomes void when the invoked function terminates.

In other words, an invoked function will by default not override constraints that apply to the function invoking it, whereas, when an invoked function imposes a constraint, this constraint will no longer apply when the invoked function is terminated and execution of the invoking function is resumed.

Of course, there is always a possibility of both an invoking function and a function invoked by it comprising constraint instructions which define different values for a same parameter. In order to avoid conflicts between a first constraint set first by the invoking function and a second constraint set later by the invoked function, it can be provided that the stricter one will prevail. I.e. if a first speed limit is imposed by the invoking function, and a second, lower one is imposed by the invoked function, the second one will hold while the invoked function is being executed, whereas if the second speed limit is higher than the first, the first speed limit will continue to apply during execution of the invoked function. Thus a programmer writing the code of the invoking function will not have to bother about the possibility of an invoked function overriding necessary constraints.

On the other hand, there can be cases where an excessively strict constraint imposed by an invoking function will prevent proper operation of the invoked function. Therefore, it may be appropriate to issue a notice or a warning when the invoked function sets a less strict constraint than the one invoking it, so that a programmer will be aware of the fact and can amend constraint instructions accordingly if the constraint imposed by the invoking function causes the invoked one to malfunction.

Evidently, issuing such a notice is particularly useful while the program is still under development.

Requiring the invoking function always to set a constraint appropriately for a function to be invoked, and resetting it when that function has terminated is error-prone and is likely to produce clumsy, lengthy code, the operational safety of which is difficult to ascertain. There should therefore be a possibility of the constraint of the invoked function to prevail over that of the invoking one.

It would be desirable to be able to specify in the program whether when a specific function is invoked, constraints of the invoking function or of the invoked one shall prevail. One possibility would be to specify, in the function call instruction of the invoking function, which one of the constraints shall be applicable, but this would require rather profound adaptations of a compiler or interpreter used for converting the action instructions of the program into machine-level instructions that can be directly input into the robot by the operation controller. The effect may be achieved more conveniently by providing a constraint instruction which invalidates a previously set constraint while a subsequent action instruction is being executed.

Constraint instructions may define at least one of

- an allowed operating region in which the manipulator is allowed to move (or, equivalently, a region which the manipulator is not allowed to enter);
- an allowed maximum speed of the manipulator,
- an allowed maximum momentum of the manipulator,
- an allowed maximum force applied by the manipulator to an outside object;
- a required minimum distance of the manipulator from an object within reach of the manipulator.

Carrying out the action instruction by simulation in step c) may be appropriate while the program is under development. In practical operation, the action instruction will be carried out by physically moving the manipulator.

Upon violation of a constraint, the robot system will enter "safety mode". Safety modes may be different depending on whether the program is under development or the program controls practical operation of the manipulator.

Recording details of the violation after entry into safety mode is particularly useful while the program is under development, because the recorded details may help the developer to identify a reason for the violation and remove it.

In safety mode, a choice between at least two of the following options can be made:

- stopping the manipulator;
- reducing an allowed maximum speed of the manipulator;
- reducing an allowed maximum momentum of the manipulator;
- reducing an allowed maximum force applied by the manipulator to an outside object;
- resuming normal operation of the manipulator,
- querying a supervisor's decision whether to stop or to resume operation.

Preferably, the choice will be based on a setting defined before entering safety mode.

Stopping the manipulator is an option both while the program is under development and in practical operation. Reducing an allowed maximum of one of the parameters enumerated above may be useful in practical operation in order to reduce a risk to persons in the vicinity of the manipulator while avoiding a stop of the manipulator. Violations may differ in severity, so that in case of a slight violation, reducing the allowed maximum of a parameter may be sufficient, while in case of a serious violation, a stop may be necessary. Querying a supervisor's decision whether to stop or to resume operation may be useful while the program is under development, in order to give the programmer time to study the violation and its possible causes before the manipulator moves further. In practical operation, it may enable resumption of operation if the violation was due to an unforeseeable incident such as the intrusion of a person into a safety range of the manipulator, and after the reason for the violation has been removed.

The method may further comprise steps of

- d) reading from the manipulator control program an instruction specifying a function to be invoked in case of a violation, and
- e) executing the specified function after entry into safety mode. This facilitates the implementation of different reactions to a violation while the program is under development, on the one hand, and in case of practical operation, on the other.

According to another aspect of the invention, the above object is achieved by a robot system comprising

- a manipulator,
- an operation controller adapted to control the manipulator to carry out an action instruction from a manipulator control program, and a safety controller adapted to detect whether a constraint is respected or not when carrying out the action instruction, wherein the safety controller is adapted to extract the constraint from a constraint instruction of the manipulator control program.

Preferably the robot system is adapted to carry out the method described above.

Finally, the object is achieved by a manipulator control program for the robot system defined above, the program comprising action instructions executable by the operation controller to control the manipulator to carry out the action instruction, and constraint instructions from which at least one constraint to be observed while executing the action instruction is adapted to be extracted by the safety controller.

BRIEF DESCRIPTION OF THE SEVERAL VIEWS OF THE DRAWING(S)

FIG. 2 illustrates the structure of a manipulator control program in accordance with the disclosure.

DETAILED DESCRIPTION OF THE INVENTION

Figure 1:
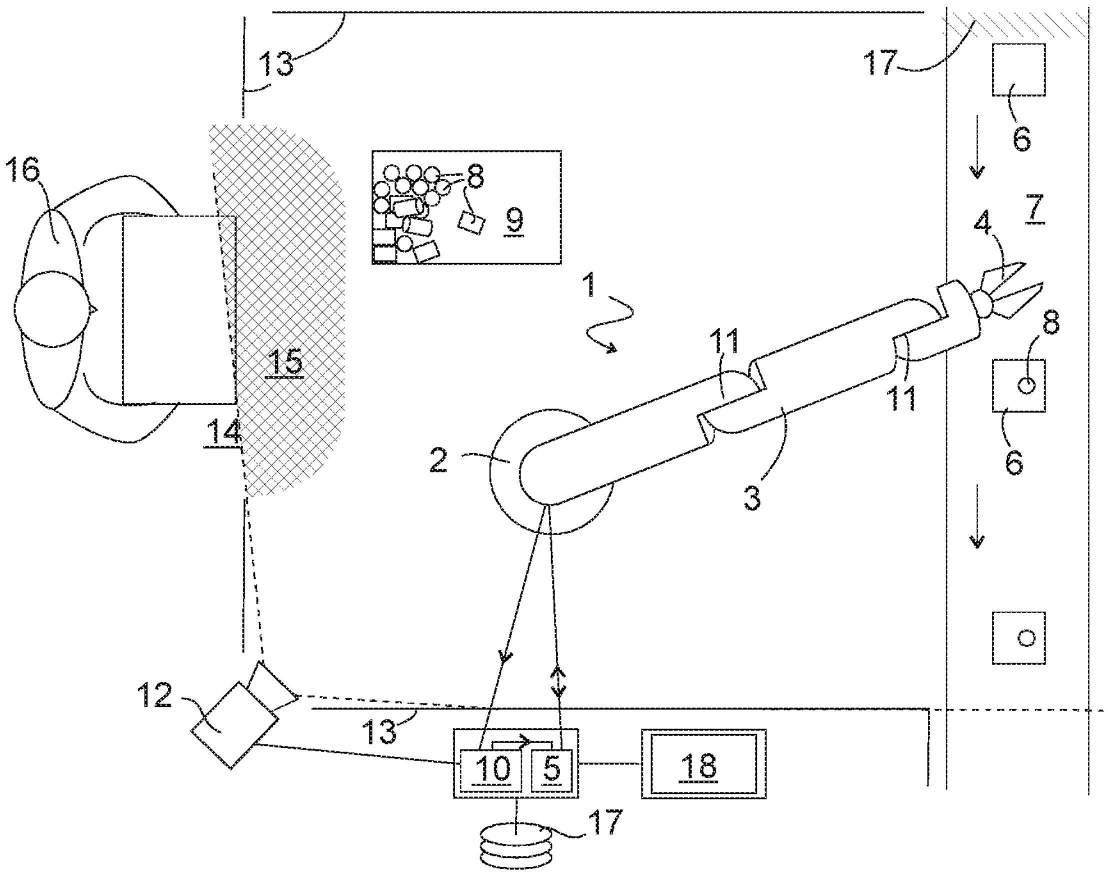
FIG. 1 is a diagram of a robot system in which the invention can be implemented in accordance with the disclosure.
Figure 3:
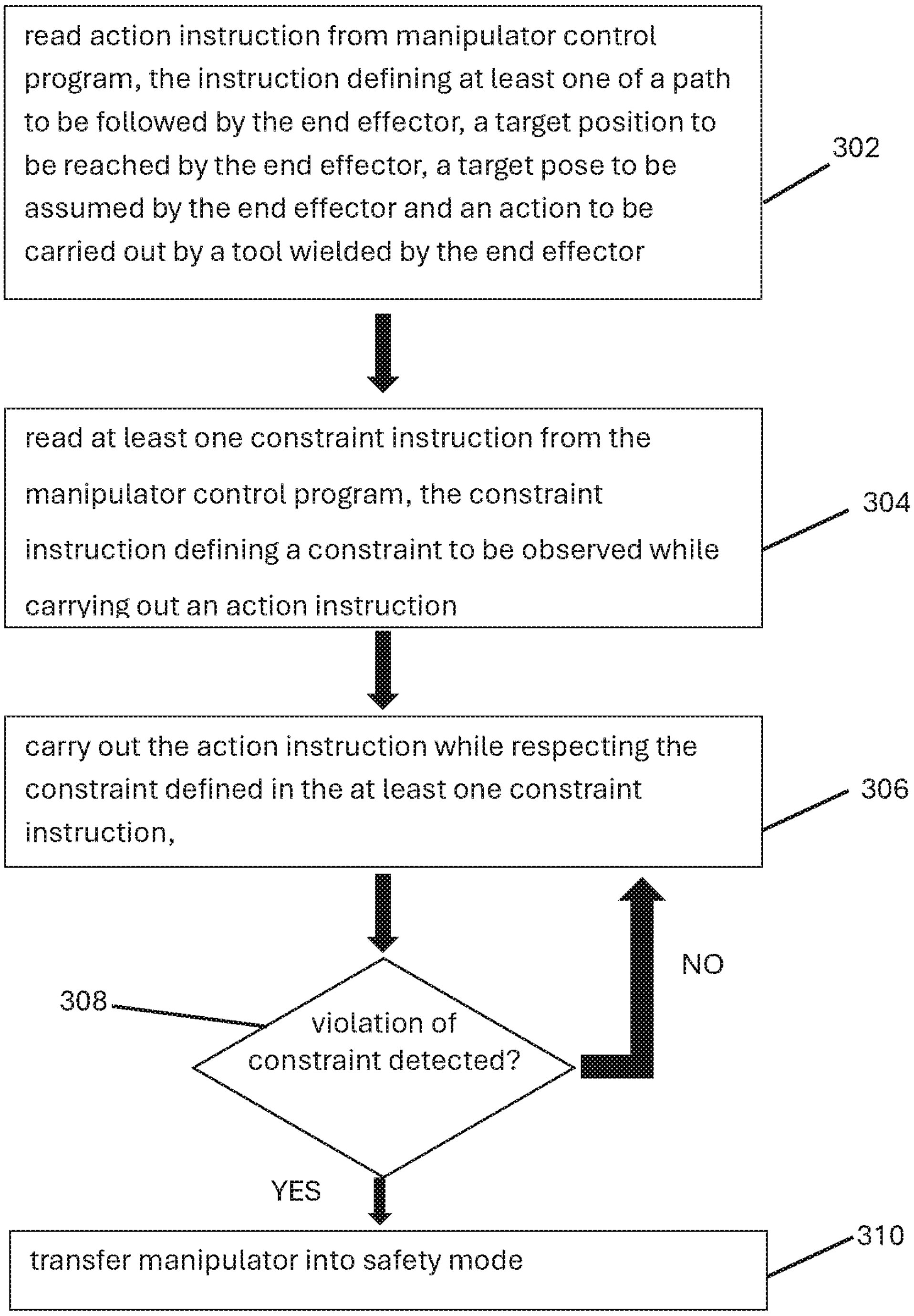
FIG. 3 is a flowchart for a method in accordance with the disclosure.

FIG. 1 is a schematic plan view of an industrial robot and its working environment. In the embodiment shown here, a manipulator 1 of the robot has a stationary base 2, at least one articulated arm 3 and an end effector 4 at the free end of the arm 3, but it should be kept in mind that the method which will be described subsequently is also applicable to other types of robots, such as a gantry type robot, mobile robots etc.

The motion of the manipulator 1 is controlled by an operation controller 5, typically a microcomputer, in order to carry out a predefined manufacturing task, for example combining each of a series of first workpieces 6, supplied by a conveyor 7, with a second workpiece 8, taken from a crate 9. In the crate, workpieces 8 can have various orientations, upright, horizontal or piled up under arbitrary angles.

Besides operation controller s, a safety controller 10 is provided. Each controller 5, 10 may be implemented by a processor of its own, and in the description below it will be assumed that they are, it being understood that they can easily and even more economically be implemented as distinct software modules executed by a same processor, as far as certain data quarantine measures described below are taken in order to prevent a failure state from spreading from one controller to the other, in particular from operation controller 5 to safety controller 10.

Both controllers 5, 10 are connected to internal sensors of manipulator 1, in order to receive from these data relating to angles of all joints 11 of the manipulator 1, to electrical power absorbed by motors of the manipulator 1, etc., that enable each controller 5, 10 to calculate a current pose of the manipulator 1 and velocities of its various components.

The safety controller 10 is connected to a spatially resolving sensor 12, typically an electronic camera, which is designed and positioned to monitor the manipulator 1 and its vicinity. In FIG. 1, the sensor 12 is represented as a single camera. In practice it may comprise several cameras viewing the manipulator 1 from different directions, so that no object in the vicinity can be hidden from all cameras at a time by the manipulator 1, and so that the safety controller 10 can determine coordinates of an object seen by more than one camera by triangulation. Data from sensor 12 can be used to enable the safety controller 10 to detect a discrepancy between a pose calculated from the data of the internal sensors of the manipulator and a pose seen in the data from sensor 12, and to switch into a safety mode if a discrepancy between these poses is significant; they can further be used to detect moving objects and persons, their positions and speeds and to enter the safety mode if it judges that there is a possibility of conflict between the object or person and the manipulator 1.

In the simplest case, the safety mode can involve a complete halt of the robot. Alternatively, in the safety mode, maximum speed of the manipulator 1 can be set low enough to avoid injury to a person if it comes into contact with the manipulator while the person is standing still or moving at moderate speed. This can be done by specifying a speed limit which the manipulator 1 must not exceed in safety mode, or, taking into account the weight and inertial moment of the manipulator 1 and, possibly, of an object carried by its end effector 4, by limiting the speed so that an allowed maximum momentum of the manipulator is not exceeded. Further alternatively, motors of the manipulator may be controlled so that a force the manipulator 1 might apply to an external object touched by it is limited to an allowed maximum value low enough to prevent injury if what the manipulator touches is a person. Still further alternatively, a space in which the object is detected can be excluded from a region in which the manipulator is allowed to move. Any of the above measures can be combined; in particular, there can be safety modes at various levels in which ever stricter safety measures are adopted, the closer the manipulator is to the detected object or the higher the likeliness of conflict between the two is judged to be.

In FIG. 1 the space in which the robot is working is partially confined by walls or barriers 13. Part of these walls or barriers 13 is in the detection range of sensor 12. One of the walls 13 has a passage 14 through which a moving object or person might at any time enter the vicinity of the manipulator 1, e.g. in order to replace the crate 9 when empty, and collide with the manipulator 1. While an interaction between the person and the manipulator 1 may be desired and should not be prevented, it should be made sure that when such an interaction occurs, the manipulator 1 is at rest or at least moving slowly enough to prevent any risk of injury. Therefore the safety controller 10 defines a forbidden zone 15 which extends from the passage 14 into the vicinity and which it will not allow the manipulator 1 to enter. The dimension of the forbidden zone 15 is determined by the condition that whenever an object enters the vicinity through passage 14 with a reasonable speed, e.g. of a quickly walking human, and is detected while in the forbidden zone 15, it shall be possible to bring the manipulator 1 to rest before the object and the manipulator 1 can touch each other, or at least reduce the speed of the manipulator 1 to a safe level.

In the present example, the task of the robot and of its operation controller 5 can be divided into:

a) moving the end effector 4 to crate 9;

b) identifying a second workpiece 8 within crate 9 that is fit to be seized, and its orientation;

c) bringing the end effector into a pose in which the identified second workpiece 8 can be seized, and seizing it;

d) moving it to conveyor 7;

e) bringing the end effector into a pose suitable for combining second workpiece 8 with a first workpiece 6;

f) identifying a first workpiece 6 g) combining the first and second workpieces.

Identifying steps b) and f) can be carried out by the operation controller 5 based on sensor data and do not involve moving the manipulator 1; they will not be considered in detail here.

FIG. 2 illustrates code of a program recorded in a storage 17 associated to both controllers 5, 10. The controllers share an instruction pointer that stores the line number of an instruction to be executed, so that at a given instant a same instruction from the program is supplied to both controllers 5, 10, but is not necessarily evaluated by both. Each instruction is either an action instruction to be executed by the operation controller 5 or a constraint instruction defining a constraint, the observance of which is will be monitored by safety controller 10. The entirety of constraints valid at a given instant of operation of the robot, and the instants or conditions at which a constraint is changed from the safety configuration of the robot for the task defined in the program.

A distinguishing feature can be provided for telling apart action instructions from constraint instructions, in the present case, constraint instructions can be recognized by a first character "#".

An initial portion of the program comprises constraint instructions that define allowed ranges for various operation parameters of the robot in program lines L1 to L3. For defining ranges, a command "#allowedRange" is used, arguments of which are the parameter to be defined, and a description of an allowed range of values. These can be from zero to some allowed maximum in case of the speed with which the end effector 4 may be moved, or in case of the force it may apply to an object it is in contact with. In case of the space the manipulator is allowed to move in, specifying ranges of x, y and z coordinates along axes perpendicular to walls 13 would be sufficient and would allow to define an allowed space of cuboid shape in which the manipulator can come as close to the walls as might be necessary while prohibiting a collision with them. More complexly shaped operation spaces of the manipulator might be defined by successive #allowedRange instructions, each of which defines part of a space in which the manipulator is allowed to move, or by #forbiddenRange instructions by which part of an operation space allowed by preceding instructions is taken away again.

In many cases coordinate ranges is likely to be too limiting; so a pointer "description" to any data object appropriate for describing an irregular shape may be used.

After constraints have been set by inputting constraint instructions L1 to L3 to safety controller 10, the safety controller will monitor continuously whether movements of the manipulator 1 controlled by operation controller 5 based on action instructions of the program observe the constraints and will switch the manipulator 1 to a safety mode described above as soon as a violation of any one of these constraints is observed.

An instruction "synchPoint" in line L4 defines a program line L14 where execution is to continue in case of a violation being detected, and where it is defined what the robot will do in safety mode. The instruction may reoccur anywhere in the program, in order to enable variable reactions to a constraint violation depending on what the robot is doing in the moment the violation occurs.

A first action instruction to operation controller 5, in line L5, is to identify crate 9 in image data from sensor 12 and to return a position "pCrate" close to the crate 9 from where the end effector 4 can dive into the crate 9 in order to seize a workpiece 8. Instructions making up the function "find (Crate)" invoked in line L5 are stored in a region of storage 17 starting at line L12 in FIG. 2. When the "find" function is invoked, the safety controller records the fact, and it also takes note of the instruction pointer returning to an instruction following L5 in the main function after the function "find" has terminated, but since the function "find" has no constraint instructions, constraints set by lines L1 to L3 of the main function continue to hold during execution of the function.

In a loop repeated while there are workpieces 8 in the crate, the manipulator is moved to the position pCrate by the action instruction of line L6, a suitable workpiece 8 is identified, and the end effector 4 is moved into a position and orientation appropriate for seizing it (L7), and seizes the workpiece.

Let us consider the case where the workpieces 8 are fragile, and touching one or the other of them with the force allowed in line L3 might cause damage. This problem can conveniently be dealt with by replacing lines L7, L8 of FIG. 2 by a function call "seizeWorkpiece(pWorkpiece, orientation)". Arguments of the function call can be the same as of action instruction L7. The code of the invoked function comprises a constraint instruction "#allowedRange [force, 0, Fmax1]" which overrides that of L3 and ensures, by Fmax1 being lower than Fmax, that when action instructions that may be identical in wording to L7 and L8 are subsequently carried out within the function, workpieces 8 will be touched so softly that damage is prevented. When the function "seizeWorkpiece" terminates, the safety controller will replace constraint settings made in it by those of the main function, so that when execution of the main function continues, the definition of L3 is valid again.

With the workpiece 8 seized, the manipulator 1 has to move towards conveyor 7. While in case of approaching the crate 9, the possibility of a person rushing in though passage 14 and bumping into the manipulator could not be excluded, and the choice of allowed maximum speed vmax in L3 had to take account of this possibility, there is no way by which a person could run into the manipulator while it is moving away from passage 14. Therefore, exceptionally, a speed exceeding vmax can be allowed for the approach to the conveyor 7. Analogous to the case discussed above, such a higher speed could be allowed by programming the approach to the conveyor 7 as a call of a function in which the limit set by L2 is locally overruled by a higher limit.

Such a way of programming is risky, however, in that a programmer might unintentionally release a constraint by writing a function call without being aware that the called function will override a constraint to which the calling function is subject. In order to avoid such a possibility, the constraint imposed by L2 is released momentarily, by the constraint instruction of L9: the prefix "#once" ensures that the higher speed limit defined by "Sallowed Range [speed, 0, vmax1]" (wherein vmax1>vmax) will apply to the next action instruction L10, which is the instruction to move to the conveyor 7. Here the manipulator 1 will wait for the next workpiece 6 to appear, and the loop ends by the manipulator 1 mounting the workpiece 8 held by it to said next workpiece 6 (L11). The loop is repeated while there are workpieces 8 left in the crate 9.

Let us also consider the case where the workpieces 8 are resistant to a high force and their installation in workpiece 6 requires application of a force Fmax1 that is higher than the force allowed in L3. Just as discussed above for the speed, the constraint of L2 might be temporarily overridden by a command "#once #allowedRange [force, 0, Fmax1]" in the main function, but that would require the programmer dealing with programming the overall movement of the manipulator to consider details of the installation process. This may easily lead to programming errors, and it makes adapting the program to variations of the workpieces complicated. Therefore, in this case, releasing the constraint of L2 by imposing a less strict constraint on force in a function governing the installation process would be the preferred option. The problem of preventing an unintended release of constraints in such a case can be dealt with in the process of developing the program of FIG. 2, as will be explained below.

If the program has been drawn up properly, violations of constraints should not occur during normal operation. They may occur, however, while the program is under development, and a substantial part of the development effort is to adapt the movements the manipulator must perform in order to accomplish its task and the safety configuration to each other so that the task can be accomplished while all safety requirements for persons and hardware are met.

While the program of FIG. 2 is under development, the physical manipulator 1 can be replaced by a software model which, when fed the instructions which the physical manipulator 1 would receive from controller 5, calculates the pose the manipulator 1 would assume and the power its motors would consume if it carried out these instructions, returns resulting angle and power data as data from the internal sensors of the manipulator 1 to controllers 5 and 10, and injects a calculated image of the manipulator 1 and its vicinity into sensor 12. So damage to the manipulator 1 or to persons can be prevented while operational safety of the program is not yet certified.

In the development stage, whenever a function is invoked, the safety controller 10 compares constraints valid in the invoking function to those of the invoked function, and issues a warning if constraints of the invoked function are less strict than those of the invoking function. Thus, when the function installwp( ) invoked in line L11 of the main function of FIG. 2 comprises a constraint instruction "#allowedRange [force, 0, Fmax1"] in which Fmax1>Fmax, the safety controller 10 issues a warning to the programmer via a display 20, and requires the programmer to confirm that loosening of the constraint is intentional. If it isn't, the programmer will have to amend the program, if the programmer confirms to the safety controller 10 that loosening the constraint is intended, the safety controller 10 enables further execution of the program.

Addresses specified in #synchPoint instructions will in most cases be modified when development is finished, and the program is employed in production mode. While in the development stage, code accessed via a in #synchPoint instruction may specify debugging functions such as a storage dump or step-by-step operation, allowing (simulated) movement of the manipulator 1 to continue, the safety mode entered in case of a violation in production mode will actually cause the manipulator 1 to stop, to slow down or to limit movements of the manipulator 1 in some other appropriate way.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

REFERENCE NUMERALS

1 manipulator
2 base
3 arm
4 end effector
5 operation controller
6 first workpiece
7 conveyor
8 second workpiece
9 crate
10 safety controller
11 joint
12 sensor
13 wall, barrier
14 passage
15 forbidden zone
16 person
17 storage
18 display

What is claimed is:

1. A method for implementing a safety configuration for a manipulator comprising an end effector, the method comprising:

a) reading an action instruction from a manipulator control program, the instruction defining at least one of a path to be followed by the end effector, a target position to be reached by the end effector, a target pose to be assumed by the end effector and an action to be carried out by a tool wielded by the end effector;

b) reading at least one constraint instruction from the manipulator control program, the constraint instruction defining a constraint to be observed while carrying out an action instruction; and c) carrying out the action instruction read in a) while respecting the constraint defined in the at least one constraint instruction, or transferring the manipulator into a safety mode when violation of the at least one constraint is detected while carrying out the action instruction;

wherein instructions of the manipulator control program are grouped into functions, the functions comprising a main function and functions invoked directly by the main function or indirectly via one or more intermediate functions, wherein by default:

a constraint instruction of an invoking function is valid during execution of a function invoked by it, and/or a constraint instruction of an invoked function becomes void when the invoked function terminates; and wherein when the constraint instruction of an invoking function is stricter than the constraint instruction of a function invoked by it, a notice is output.

2. The method of claim 1, wherein the manipulator is part of a robot system further comprising an operation controller adapted to control the manipulator to carry out an action instruction, and a safety controller adapted to detect whether a constraint is respected or not, and wherein step a) is carried out by the operation controller but not by the safety controller, and step b) is carried out at least by the safety controller.

3. The method of claim 1, wherein when the constraint instructions of an invoking function and of a function invoked by it are contradictive, a stricter one of the constraint instructions prevails.

4. The method of claim 1, wherein when the constraint instructions of an invoking function and of a function invoked by it are contradictive, the constraint instruction of the invoked function prevails.

5. The method of claim 1, wherein the constraint instruction defines at least one of:

an allowed operating region of the manipulator;
an allowed maximum speed of the manipulator;
an allowed maximum momentum of the manipulator;
an allowed maximum force applied by the manipulator to an outside object; and
a required minimum distance of the manipulator from an object within reach of the manipulator.

6. The method of claim 1, wherein in c) the action instruction is carried out by simulation.

7. The method of claim 1, wherein in c) the action instruction is carried out by physically moving the manipulator.

8. The method of claim 1, wherein after entry into safety mode, details of the violation are recorded.

9. The method of claim 1, wherein in safety mode, a choice between at least two of the following options is made based on a setting defined before entering safety mode:

stopping the manipulator;
reducing an allowed maximum speed of the manipulator;
reducing an allowed maximum momentum of the manipulator;
resuming normal operation of the manipulator; and
querying a supervisor's decision whether to stop or to resume operation.

10. The method of claim 1, further comprising d) reading from the manipulator control program an instruction specifying code to be executed in case of a violation, and e) entering safety mode by executing the specified code.

11. A robot system, comprising:

a manipulator;
an operation controller adapted to control the manipulator to carry out an action instruction from a manipulator control program; and
a safety controller adapted to detect whether a constraint is respected or not when carrying out the action instruction;
wherein the safety controller is adapted to extract the constraint from a constraint instruction of the manipulator control program;
wherein instructions of the manipulator control program are grouped into functions, the functions comprising a main function and functions invoked directly by the main function or indirectly via one or more intermediate functions, wherein by default:
a constraint instruction of an invoking function is valid during execution of a function invoked by it, and/or
a constraint instruction of an invoked function becomes void when the invoked function terminates; and
wherein when the constraint instruction of an invoking function is stricter than the constraint instruction of a function invoked by it, a notice is output.

12. An operation controller associated with a manipulator and having thereon stored a manipulator control program for a robot system, the manipulator control program comprising action instructions executable by the operation controller to control the manipulator of the robot system to carry out an action instruction, the manipulator control program comprising constraint instructions from which a constraint to be observed while executing the action instruction is adapted to be extracted by a safety controller; wherein:

a) the action instruction defines at least one of a path to be followed by an end effector, a target position to be reached by the end effector, a target pose to be assumed by the end effector and an action to be carried out by a tool wielded by the end effector;
wherein b) the at least one constraint instruction defines a constraint to be observed while carrying out an action instruction;
wherein c) the action instruction is carried out under the constraint defined in the at least one constraint instruction, or the manipulator is transferred into a safety mode if violation of the at least one constraint is detected while carrying out the action instruction;
wherein instructions of the manipulator control program are grouped into functions, the functions comprising a main function and functions invoked directly by the main function or indirectly via one or more intermediate functions, wherein by default:
a constraint instruction of an invoking function is valid during execution of a function invoked by it, and/or
a constraint instruction of an invoked function becomes void when the invoked function terminates; and
wherein when the constraint instruction of an invoking function is stricter than the constraint instruction of a function invoked by it, a notice is output by the operating controller.

* * * * *